(12) United States Patent
Lee et al.

(10) Patent No.: US 12,073,852 B2
(45) Date of Patent: Aug. 27, 2024

(54) ELECTRONIC DEVICE AND METHOD FOR AUTOMATICALLY GENERATING EDITED VIDEO

(71) Applicant: SAMSUNG ELECTRONICS CO., LTD., Suwon-si (KR)

(72) Inventors: Bohee Lee, Suwon-si (KR); Euihwa Noh, Suwon-si (KR); Jiyoon Park, Suwon-si (KR); Jaehee Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/070,743

(22) Filed: Nov. 29, 2022

(65) Prior Publication Data

US 2023/0143688 A1   May 11, 2023

Related U.S. Application Data

(63) Continuation of application No. PCT/KR2022/017023, filed on Nov. 2, 2022.

(30) Foreign Application Priority Data

Nov. 9, 2021 (KR) .......................... 10-2021-0153433
Feb. 10, 2022 (KR) .......................... 10-2022-0017425

(51) Int. Cl.
*G06F 3/048* (2013.01)
*G06F 3/04847* (2022.01)
(Continued)

(52) U.S. Cl.
CPC ........ *G11B 27/036* (2013.01); *G06F 3/04847* (2013.01); *G06F 16/7834* (2019.01); *G11B 27/034* (2013.01); *G11B 27/10* (2013.01)

(58) Field of Classification Search
CPC ..... G11B 27/036; G11B 27/034; G11B 27/10; G06F 16/7834; G06F 3/0487
See application file for complete search history.

(56) References Cited

U.S. PATENT DOCUMENTS 9,196,306 B2   11/2015   Flint et al.
10,057,636 B1 *   8/2018   Nijim ................. H04N 21/4325
(Continued)

FOREIGN PATENT DOCUMENTS

| CN | 108028902 A | * | 5/2018 | ........... A61B 5/1122 |
| JP | 2003-032612 A | | 1/2003 | |

(Continued)

OTHER PUBLICATIONS

PCT International Search Report dated Feb. 10, 2023 for PCT/KR2022/017023.

(Continued)

*Primary Examiner* — Rashawn N Tillery
(74) *Attorney, Agent, or Firm* — Nixon & Vanderhye P.C.

(57) ABSTRACT

An electronic device may include a touchscreen display, and a processor, wherein the processor may be configured to receive a first input to select a plurality of videos generated from at least two difference sources, perform video synchronization so that timelines of the plurality of selected videos coincide, extract segmental clips selected in each section from the respective videos, based on a main subject selected by analyzing the plurality of videos, adjust different segmental clips so that subjects included in the different segmental clips are synchronized based on a segmental clip in a first section, automatically generate a cross-edited video by joining segmental clips of respective sections in which the subjects are synchronized, and display the cross-edited video on the touchscreen display.

20 Claims, 10 Drawing Sheets

(51) Int. Cl.
*G06F 16/783* (2019.01)
*G11B 27/034* (2006.01)
*G11B 27/036* (2006.01)
*G11B 27/10* (2006.01)

(56) References Cited

U.S. PATENT DOCUMENTS

| | | | | |
|---|---|---|---|---|
| 10,448,063 | B2* | 10/2019 | Gray | H04N 21/23424 |
| 11,545,187 | B2* | 1/2023 | Haley | H04N 21/2743 |
| 11,594,256 | B2* | 2/2023 | Boyd | H04N 21/47205 |
| 11,727,201 | B2* | 8/2023 | Datar | G06F 40/169 |
| | | | | 715/230 |
| 2003/0142954 | A1 | 7/2003 | Kotani et al. | |
| 2008/0155420 | A1* | 6/2008 | Ubillos | G06F 3/04847 |
| | | | | 715/723 |
| 2009/0087161 | A1* | 4/2009 | Roberts | H04N 5/262 |
| | | | | 386/285 |
| 2010/0281375 | A1* | 11/2010 | Pendergast | G11B 27/34 |
| | | | | 715/723 |
| 2010/0281378 | A1* | 11/2010 | Pendergast | G11B 27/34 |
| | | | | 715/731 |
| 2010/0281379 | A1* | 11/2010 | Meaney | G11B 27/031 |
| | | | | 715/723 |
| 2012/0051658 | A1* | 3/2012 | Tong | G11B 27/34 |
| | | | | 382/224 |
| 2013/0125000 | A1* | 5/2013 | Fleischhauer | G11B 27/10 |
| | | | | 715/723 |
| 2015/0149960 | A1 | 5/2015 | Song et al. | |
| 2015/0332096 | A1* | 11/2015 | Wang | G06V 20/48 |
| | | | | 348/513 |
| 2016/0104508 | A1* | 4/2016 | Chee | H04N 21/2668 |
| | | | | 386/227 |
| 2016/0155475 | A1* | 6/2016 | Hamer | H04N 21/8456 |
| | | | | 386/224 |
| 2016/0180883 | A1* | 6/2016 | Hamer | G11B 27/031 |
| | | | | 386/201 |
| 2017/0134714 | A1* | 5/2017 | Soni | H04N 13/189 |
| 2018/0054648 | A1* | 2/2018 | Matias | H04N 21/47205 |
| 2018/0174617 | A1* | 6/2018 | Shore | G06Q 30/0631 |
| 2018/0204597 | A1* | 7/2018 | Rav-Acha | H04N 21/23439 |
| 2019/0213420 | A1* | 7/2019 | Karyodisa | G06V 20/41 |
| 2019/0364211 | A1* | 11/2019 | Chun | H04N 5/144 |
| 2022/0262406 | A1* | 8/2022 | Daugherty | G11B 27/031 |

FOREIGN PATENT DOCUMENTS

| | | | |
|---|---|---|---|
| JP | 2007-074277 A | 3/2007 | |
| JP | 2010-541415 A | 12/2010 | |
| JP | 5050445 B2 | 8/2012 | |
| KR | 10-2015-0059534 A | 6/2015 | |
| KR | 10-1915540 | 10/2018 | |
| KR | 10-1968953 | 4/2019 | |
| KR | 10-2143756 | 8/2020 | |
| KR | 10-2143756 B1 | 8/2020 | |
| WO | WO-2010068175 A2 * | 6/2010 | G11B 27/028 |
| WO | WO-2013170027 A1 * | 11/2013 | H04N 21/4307 |
| WO | WO-2014093668 A1 * | 6/2014 | G11B 27/031 |
| WO | WO-2020176785 A1 * | 9/2020 | G11B 20/10527 |
| WO | WO 2023/085679 A1 | 5/2023 | |

OTHER PUBLICATIONS

PCT Notification of Publication dated May 19, 2023 for PCT/KR2022/017023.

* cited by examiner

FIG. 4
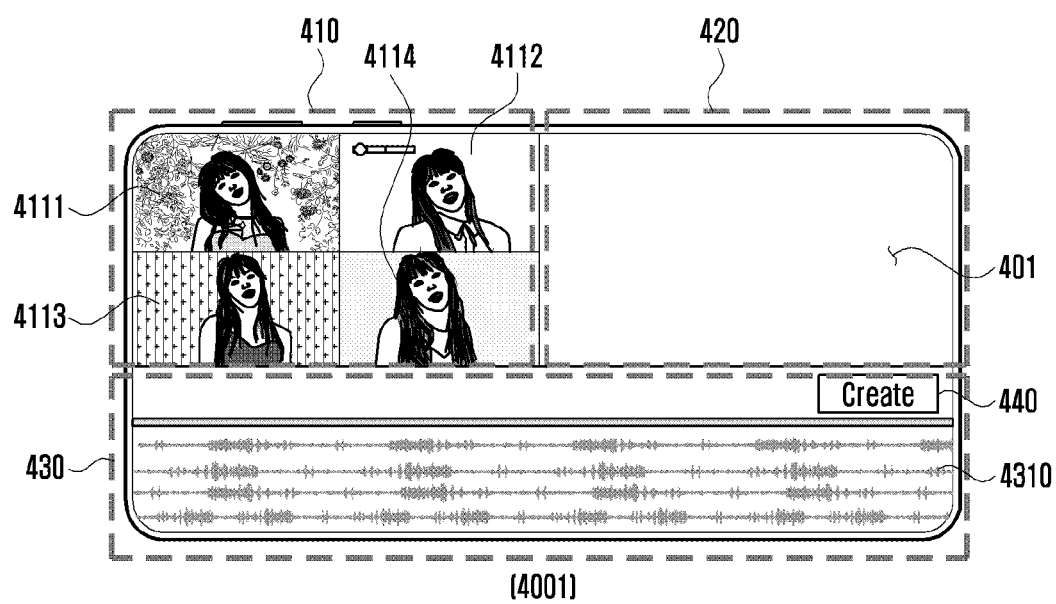
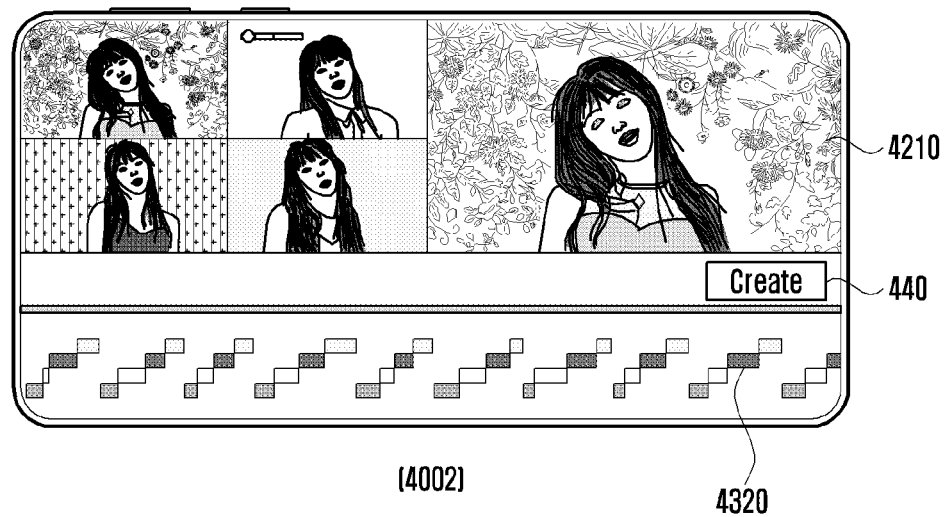

FIG. 5B
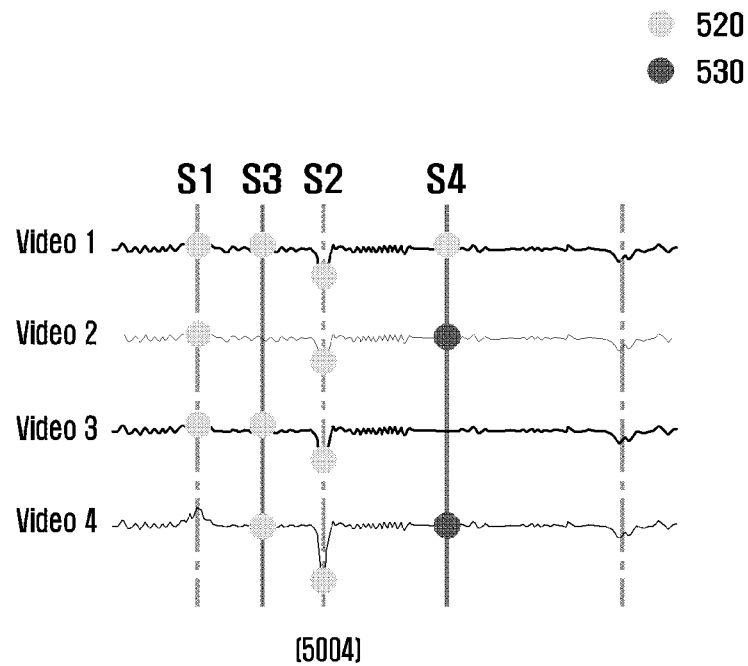
(5004)
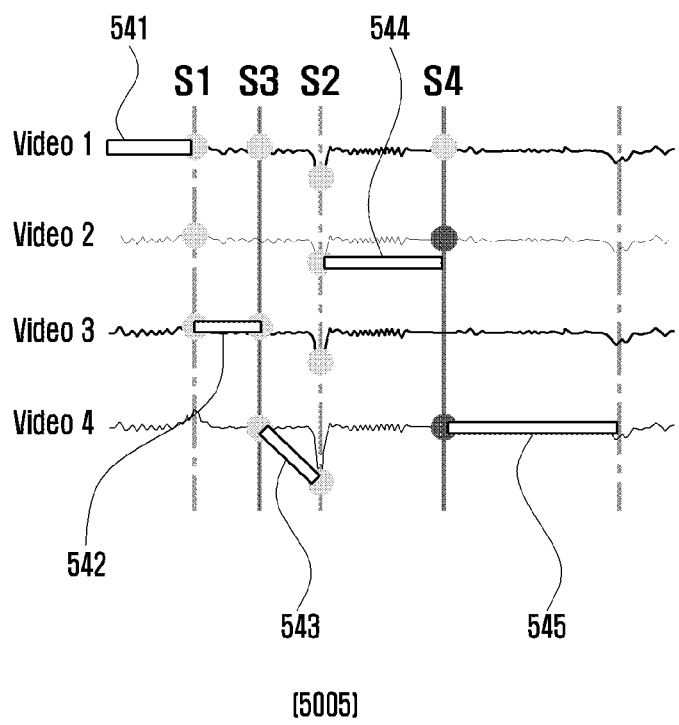
(5005)

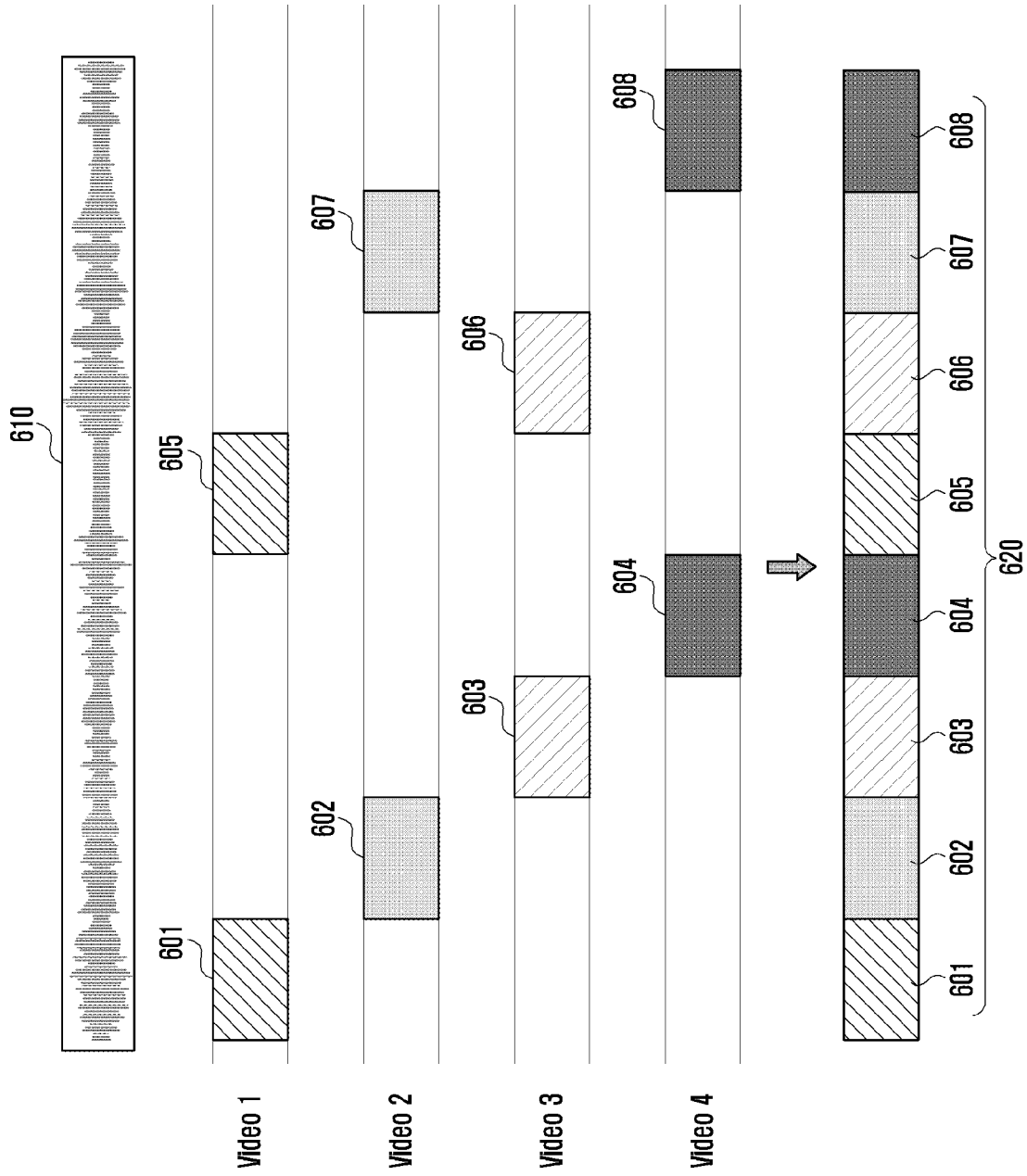

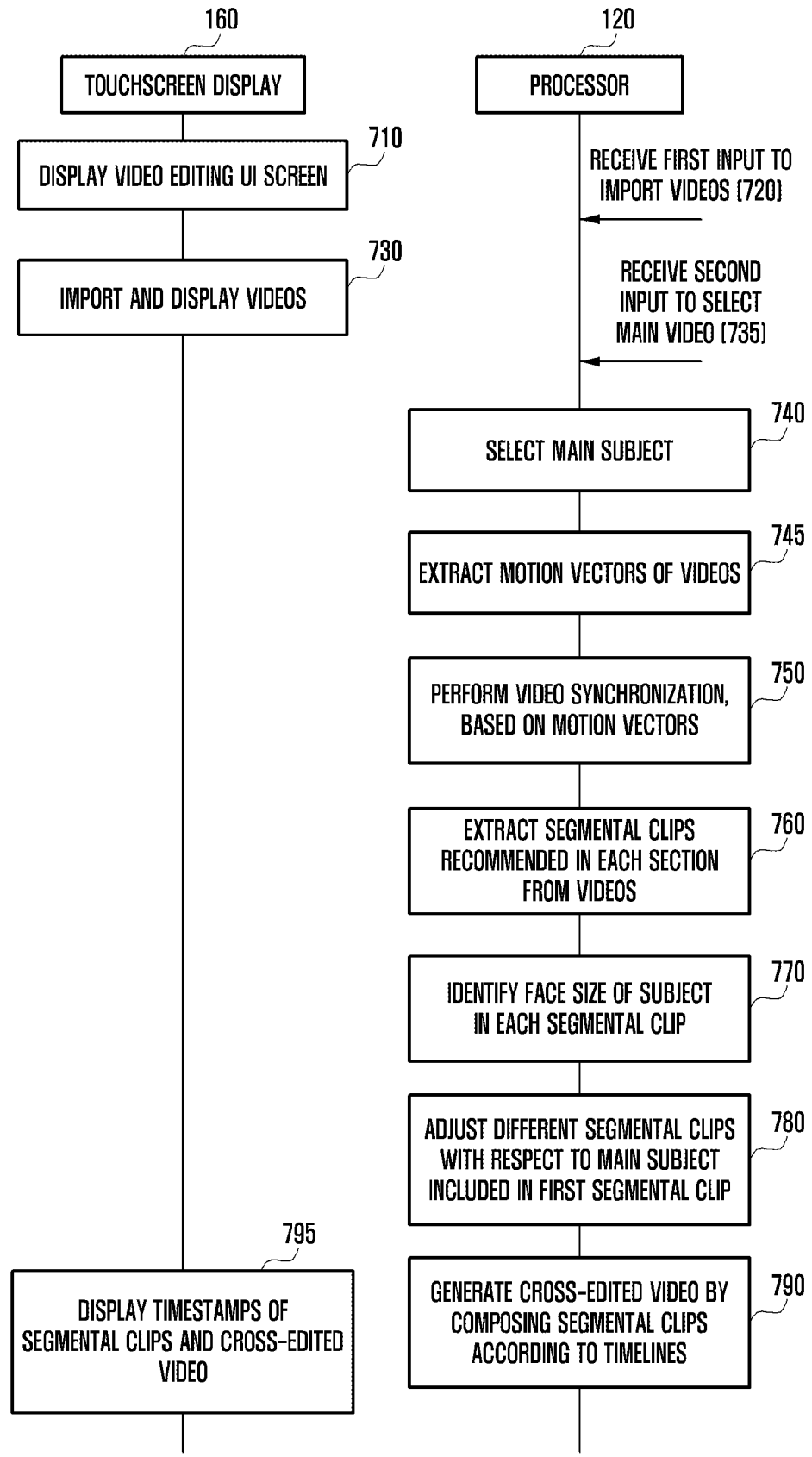

FIG. 8
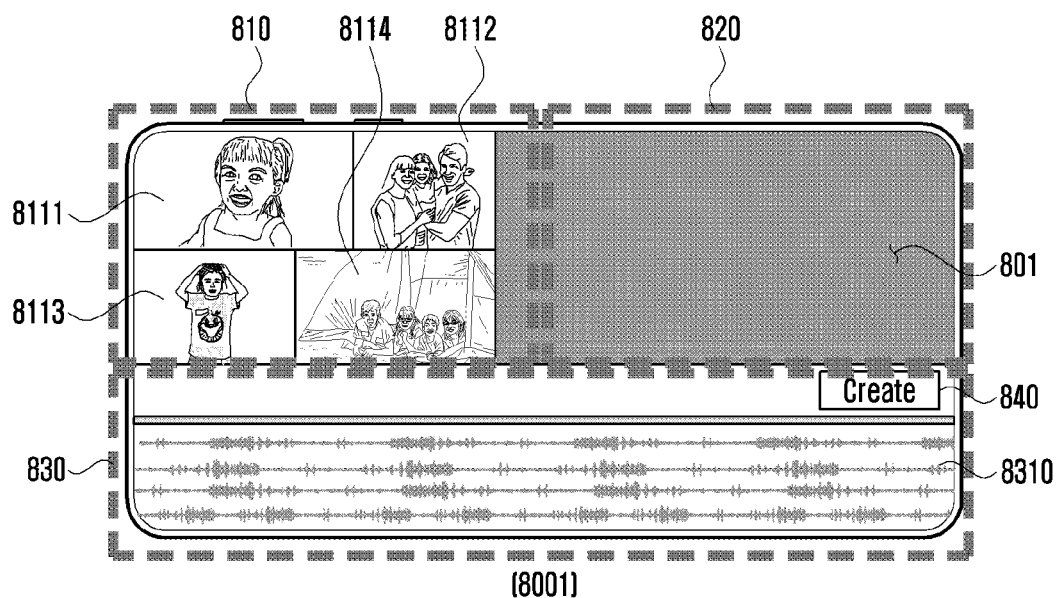
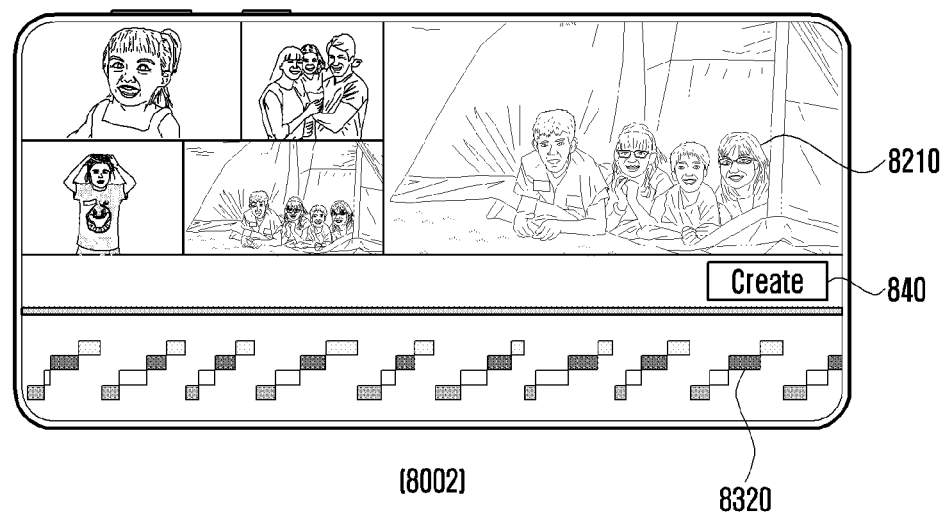

ELECTRONIC DEVICE AND METHOD FOR AUTOMATICALLY GENERATING EDITED VIDEO

CROSS-REFERENCE TO RELATED APPLICATIONS

This application is a continuation of International Application No. PCT/KR2022/017023, filed Nov. 2, 2022, designating the U.S., in the Korean Intellectual Property Receiving Office, and claiming priority to Korean Patent Application No. 10-2021-0153433, filed on Nov. 9, 2021, in the Korean Intellectual Property Office, and to Korean Patent Application No. 10-2022-0017425, filed on Feb. 10, 2022, in the Korean Intellectual Property Office, the disclosures of which are all hereby incorporated by reference herein in their entireties.

BACKGROUND

Field

Various example embodiments relate to an electronic device and/or a method for automatically generating an edited video.

DESCRIPTION OF RELATED ART

An electronic device may take a video using a camera (e.g., a front camera or a rear camera) mounted in the electronic device. Recently, as a growing number of users have been taking a video using a camera of an electronic device and use the video as personal content, there has been a growing interest in video editing.

Generally, various applications or programs are being developed for video editing. However, to cross-edit a plurality of videos into a single video, a user needs to separately configure a time section in each video, adjust view angles, and designate an effect for each subject size or scene, and user inputs to configure these operations are required.

In particular, for a video into which a plurality of videos is cross-edited, an operation of smoothly joining the separate videos without a sense of disharmony as if being taken as a single video. However, this video editing technique has disadvantages in that the quality of a video depends on a person's editing ability, and users cannot easily generate a cross-edited video because a separate editing program is required.

SUMMARY

Various example embodiments provide a method for automatically generating a cross-edited video using a plurality of videos.

According to various example embodiments, an electronic device may include a touchscreen display, and a processor, wherein the processor may be configured to receive a first input to select a plurality of videos generated from at least two difference sources, perform video synchronization so that timelines of the plurality of selected videos coincide or substantially coincide, extract segmental clips selected, and/or identified in each section from the respective videos, based on a main subject selected by analyzing the plurality of videos, adjust different segmental clips so that subjects included in the different segmental clips are synchronized based on a segmental clip in a first section, automatically generate a cross-edited video at least by joining segmental clips of respective sections in which the subjects are synchronized, and display the cross-edited video on the touchscreen display.

According to various example embodiments, in a method for automatically generating a cross-edited video by an electronic device, the method may include displaying an edited video user interface screen, receiving a first input to select a plurality of videos generated from at least two difference sources through the edited video user interface screen, performing video synchronization so that timelines of the plurality of selected videos coincide or substantially coincide, extracting segmental clips selected and/or identified in each section from the respective videos, based on a main subject selected by analyzing the plurality of videos, adjusting different segmental clips so that subjects included in the different segmental clips are synchronized based on a segmental clip in a first section, automatically generating a cross-edited video at least by joining segmental clips of respective sections in which the subjects are synchronize, and display the cross-edited video on the edited video user interface screen.

According to various example embodiments, selected and/or identified segmental clips may be extracted from a plurality of videos by comparatively analyzing similarity between the videos with respect to a specific subject from the videos, an editing effect may be imparted to the segmental clips, and then the segmental clips may be joined and composed, thereby automatically generating a completely cross-edited video without a user separately performing an editing function.

According to various example embodiments, a cross-edited video may be generated only by an input to select a plurality of videos without a separate editing technique, thereby saving time required for editing and improving user convenience.

BRIEF DESCRIPTION OF DRAWINGS

The above and other aspects, features, and advantages of certain embodiments will be more apparent from the following detailed description, taken in conjunction with the accompanying drawings, in which:

FIG. 4 illustrates a cross-edited video generation screen of an example electronic device.

FIGS. 5a and 5b illustrates examples of adjusting video synchronization of videos according to various example embodiments.

FIG. 6 illustrates examples of timestamps of segmental clips according to various example embodiments.

FIG. 7 illustrates a cross-edited video generation method of an electronic device according to various example embodiments.

FIG. 8 illustrates cross-edited video generation screens of an electronic device according to various example embodiments.

DETAILED DESCRIPTION

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an example embodiment, the electronic devices are not limited to those described above.

Figure 1:
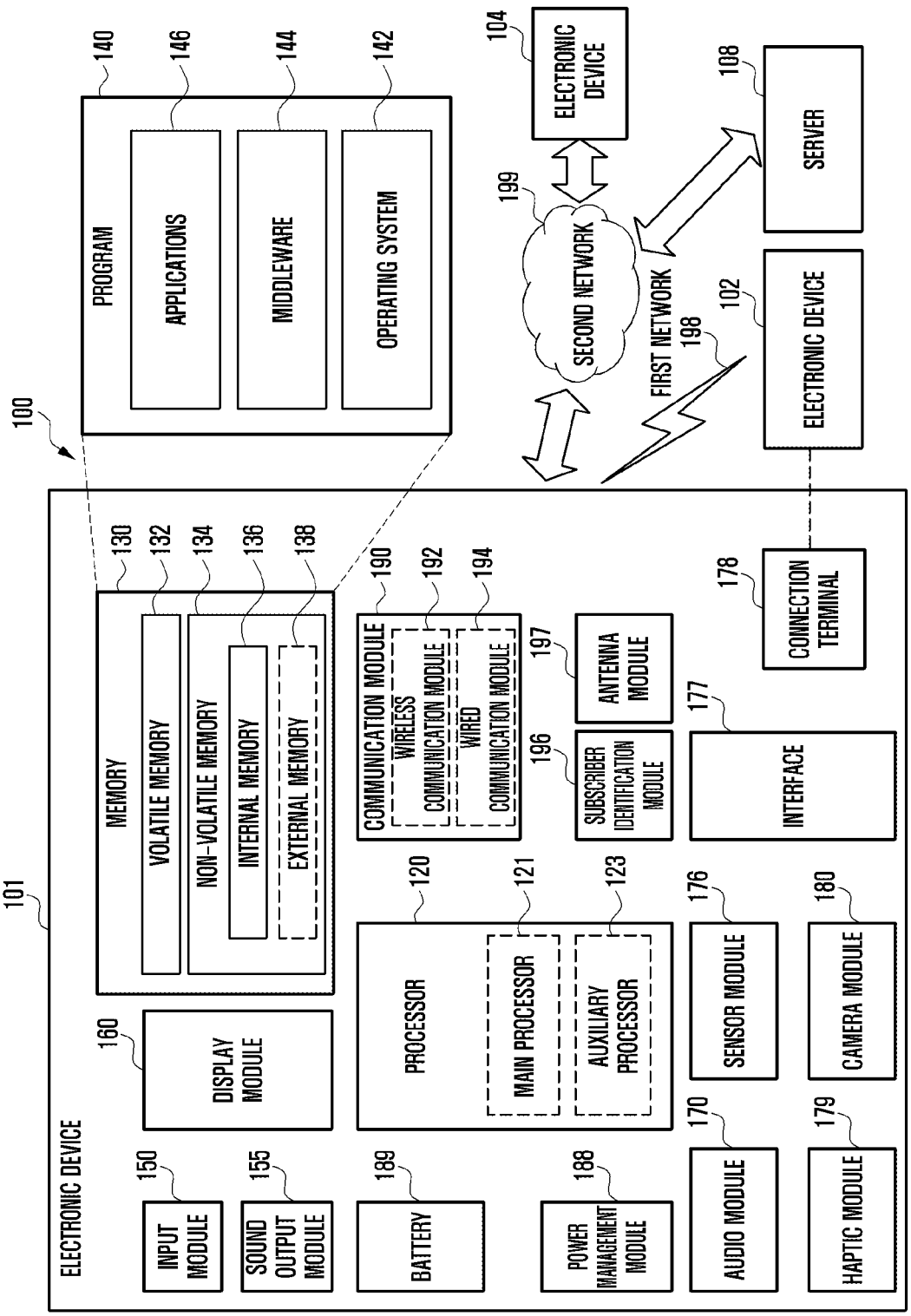
FIG. 1 is a block diagram illustrating an electronic device in a network environment according to an example embodiment.

FIG. 1 is a block diagram illustrating an electronic device in a network environment according to an example embodiment.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134 (which may comprise internal memory 136 and/or external memory 138). According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Functions or operations described below may be understood as functions performed by a processor 120 of an electronic device 101. The processor 120 may execute commands (e.g., instructions) stored in a memory 130 to implement a software module, and may control hardware (e.g., a display module 160 comprising a display, and/or a communication module 190 comprising communication circuitry) associated with the functions. In some embodiments, the operations may be sequentially performed, but is not necessarily performed sequentially. For example, the order of the operations may be changed, and at least two operations may be performed in parallel.

An electronic device 101 according to various embodiments may include a touchscreen display (e.g., the display module 160, comprising a display, of FIG. 1) and a processor (e.g., the processor 120 of FIG. 1), wherein the processor 120 may be configured to receive a first input to select a plurality of videos generated from at least two difference sources, perform video synchronization so that timelines of the plurality of selected videos coincide or substantially coincide, extract segmental clips selected by recommending and/or identified in each section from the respective videos, based on a main subject selected by analyzing the plurality of videos, adjust different segmental clips so that subjects included in the different segmental clips are synchronized based on a segmental clip in a first section, automatically generate a cross-edited video at least by joining segmental clips of respective sections in which the subjects are synchronized, and display the cross-edited video on the touchscreen display.

The processor 120 according to various embodiments may be configured to display a video editing user interface screen on the touchscreen display in response to a video editing function execution request, and the video editing user interface screen may include a first area displaying the plurality of videos, a second area displaying the cross-edited video, a third area displaying the timelines and/or timestamps of the videos, and a cross-edited video generation item.

The processor 120 according to various embodiments may be configured to control the touchscreen display to display the plurality of videos selected by the first input in the first area of the video editing user interface screen, receive a second input to select a main video from among the plurality of videos, and identify a characteristic pattern in the main video by analyzing the selected main video to determine an editing theme, based on the characteristic pattern.

The characteristic pattern according to various embodiments may include at least one of a subject face feature, a subject behavior feature, an audio feature, and a camera moving feature.

The processor 120 according to various embodiments may be configured to automatically perform at least one of unnecessary noise section deletion and video color correction for each selected video before extracting the segmental clips.

The processor 120 according to various embodiments may be configured to perform the video synchronization, based on feature points included in an audio signal of each video.

The processor 120 according to various embodiments may be configured to designate a candidate point at and/or proximate a midpoint between a first feature point and a second feature point of the audio signal for each video, a first section between the first feature point and the candidate point, and a second section between the candidate point and the second feature point, and extract the recommended (or selected) and/or identified segmental clips by comparing image frames corresponding to the first feature point, the second feature point, and the candidate point designated for each video signal to analyze similarity between the image frames and cropping part of one recommended (or selected) and/or identified video for each section among the videos.

The processor 120 according to various embodiments may be configured to select the main subject, based on the image frames corresponding to the first feature point, the second feature point, and the candidate point, or designate a subject selected by a user input as the main subject, and at least one of a subject equally exposed at the first feature point, the second feature point, and the candidate point, a subject displayed most in the videos, and a subject positioned at a center of a screen in the videos may be selected as the main subject.

The processor 120 according to various embodiments may be configured to recommend and extract a second segmental clip from a video having similarity in the main subject, based on a first segmental clip including the main subject.

The processor 120 according to various embodiments may be configured to identify data about a crop size, a crop direction, rotation, and a video ratio, and perform subject synchronization on each segmental clip, based on the identified data, so that feature points of the main subject included in the first segmental clip and the second segmental clip are similar.

The processor 120 according to various embodiments may be configured to automatically impart a scene change effect between the segmental clips, and the scene change effect may include at least one of a cut effect, a dissolve effect, and a fade effect.

When the video synchronization is unable to be performed based on the audio signal, the processor 120 according to various embodiments may be further configured to extract a motion vector according to a movement of an object included in each video, and perform time synchronization according to a video signal based on the motion vector.

Figure 2:
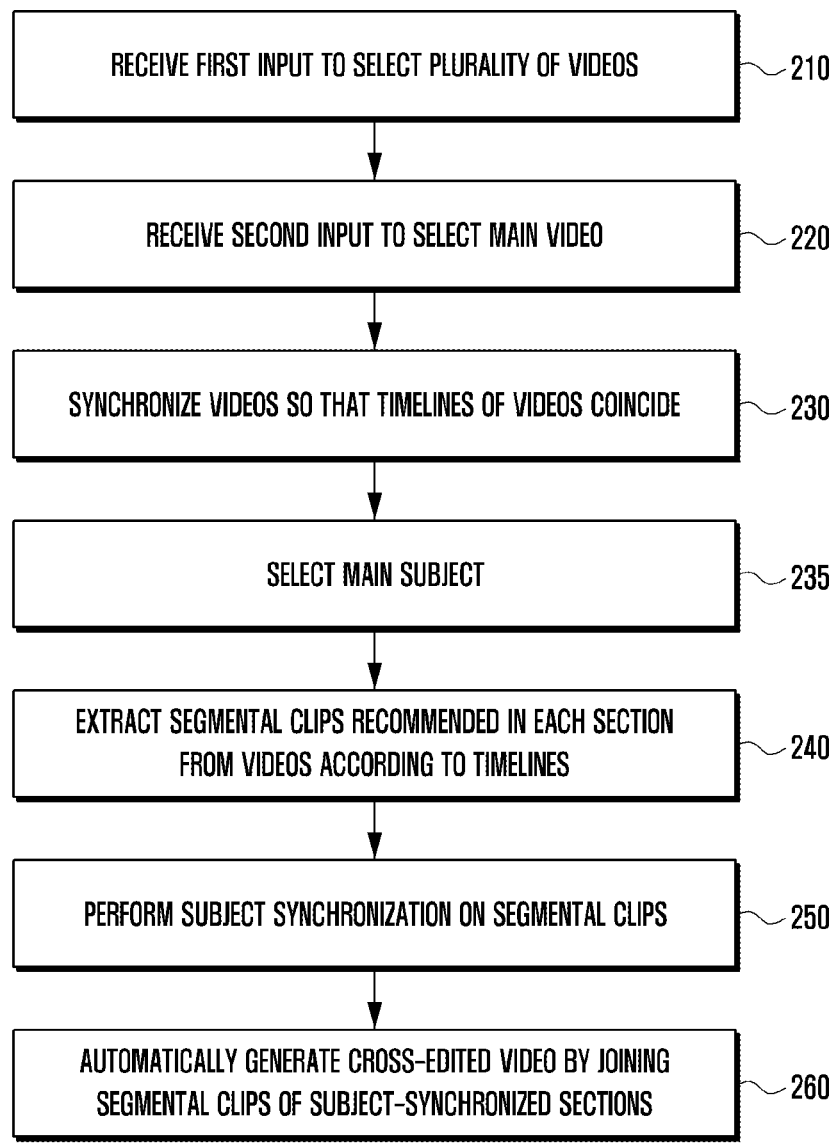
FIG. 2 illustrates a cross-edited video generation method of an electronic device according to various example embodiments.

FIG. 2 illustrates a cross-edited video generation method of an electronic device according to various embodiments.

Referring to FIG. 2, according to an embodiment, a processor (e.g., the processor 120 of FIG. 1, comprising processing circuitry) of the electronic device 101 may receive a first input to import a plurality of videos (hereinafter, referred to as base videos) in operation 210. Here, a base video is referred to only for convenience of description, and may refer to a video captured by a camera of the electronic device 101, a video provided online, a video stored in the electronic device 101, or a video stored in a server.

For example, when a video editing function is executed, the electronic device 101 may support a function of importing and displaying a plurality of base videos through a video editing user interface (UI) screen displayed on a display.

In operation 220, the processor 120 may receive a second input to select a main video from among the imported videos (e.g., the base videos).

According to an embodiment, the processor 120 may provide a pointer (or a marker or an indicator) supporting selection of a main video on the video editing UI screen, and may designate a base video imported into an area where the pointer is positioned according to a user input among the base videos as the main video.

According to another embodiment, the electronic device 101 may support a function of designating a base image imported into a specific area designated on the video editing UI screen as the main video.

According to an embodiment, the electronic device 101 may support a function of changing the main video to change an editing theme after designating the main video.

According to an embodiment, the processor 120 may generate a cross-edited video (or an after video), based on the playback length of an audio signal included in the main video, and may designate the audio signal to be used for the cross-edited video. For example, the processor 120 may generate one cross-edited video by joining segmental clips, based on the audio signal included in the main video.

According to an embodiment, the processor 120 may determine an editing theme, based on the selected main video. For example, the processor 120 may analyze the main video to extract a characteristic pattern element (e.g., a person feature, a behavior pattern, an audio feature, and a camera moving feature) in the main video, and may determine an editing theme, based on the extracted pattern element. For example, when the main video is a video in which a specific person is singing on a stage, the processor 120 may determine audio and the specific person as an editing theme.

According to an embodiment, the processor 120 may predict a characteristic pattern element in the main video using a deep learning engine, and may determine an editing theme based on the characteristic pattern element.

According to an embodiment, the electronic device 101 may support an option function of selecting an editing theme (e.g., a person similarity-oriented theme, a background similarity-oriented theme, a camera moving-oriented theme, a stage similarity-oriented theme) according to a user input after selecting the main video, and an editing theme may be configured by a user.

According to an embodiment, the electronic device 101 may automatically perform video size adjustment (deletion of an unnecessary section of a video) and video color correction (adjusting color distortion and white balance using a color correction algorithm) separately on each of the plurality of imported base videos, and these processes may be omitted.

According to another embodiment, the electronic device 101 may include a user option function of performing video size adjustment or video color correction according to a user request separately for each of the plurality of imported base videos.

In operation 230, the processor 120 may synchronize the videos so that timelines of the videos (e.g., base videos) coincide or substantially coincide.

According to an embodiment, the processor 120 may designate an audio signal of a first video (e.g., the main video) as a reference among the base videos as a main audio signal, and may synchronize the videos by excluding audio signals of other videos.

According to an embodiment, the processor 120 may synchronize the videos by matching feature points of the other videos (e.g., a second video, a third video, . . . , an Nth video) to coincide according to a feature point (e.g., a high/low change point) of a timeline of the first video (e.g., the main video) as the reference among the base videos. For example, timelines of the videos may be displayed based on at least one of an audio signal, a video signal, or a motion vector signal. Here, a feature point may be at least one of a sound source start time, a time at which a voice first comes out, a change in a facial feature point of a specific subject (e.g., the shape of a singer's lips), a time in voice change between people, and a time at which a behavioral characteristic (e.g. dancing) of a person first starts, but is not limited thereto.

According to an embodiment, the processor 120 may primarily synchronize the videos, based on an audio signal of the videos, and may secondarily perform time synchronization, based on a video signal based on motion vectors of objects included in the videos.

In operation 235, the processor 120 may select a main subject from among the objects included in the videos (e.g., the base videos).

According to an embodiment, the processor 120 may select the main subject to be the center of the cross-edited video, based on the editing theme.

According to an embodiment, the electronic device 101 may support a function of selecting a main subject according to a user input from among the plurality of base videos. The processor 120 may detect a user input to select one of subjects included in the plurality of base videos displayed on the screen, and may designate a subject selected according to the user input as the main subject.

According to an embodiment, the processor 120 may identify the objects from the respective base videos through an object recognition function, and may comparatively analyze characteristics of the objects, thereby selecting (or choosing) the main subject to be the center of the cross-edited video to be generated.

According to an embodiment, the processor 120 may additionally designate candidate points (or candidate spots), based on feature points of the synchronized video signal, and may designate an interval between a feature point and a candidate point as one segmental section.

For example, the processor 120 may designate a subject most exposed at a first feature point, a second feature point, and a candidate point as the main subject.

In another example, when a plurality of subjects is present in the videos, the processor 120 may select a subject displayed for the most time in the videos, a subject positioned most at the center of the screen in the videos, and a subject focused most at camera angles as main subjects.

The processor 120 may comparatively analyze similarity based on image frames corresponding to the feature points and the candidate points, and may crop part corresponding to a designated segmental section from one recommended (or selected) video among the base videos, thereby extracting a segmental clip.

In operation 240, the processor 120 may extract segmental clips recommended (or selected) for each section from the videos (e.g., the base videos) synchronized according to the timeline.

The processor 120 may select segmental clips recommended (or selected) from the base videos for each segmental section and may extract a plurality of segmental clips corresponding to the playback length of the video.

In operation 250, the processor 120 may adjust (or correct) the segmental clips so that the subjects are synchronized with respect to the segmental clips.

For example, the base videos may be captured in different environments, and thus at least one of face sizes, face angles, and face proportions of the main subject included in the respective segmental clips (or a sub-subject included in the segmental clips or objects included in the screen) may be different.

According to an embodiment, the processor 120 may extract a feature point (e.g., a feature point of eye, nose, mouth, and face shapes) of the main subject included in before/after segmental clips, and may perform feature matching between the before/after segmental clips, thereby obtaining a geometric transformation matrix. The processor 120 may identify data about a crop size, a crop direction, rotation, and a video ratio, based on the geometric transformation matrix, so that feature points of the main subject included in the before/after segmental clips are similar, and may perform subject synchronization on the segmental clips, based on the identified data.

According to an embodiment, the processor 120 may automatically impart a scene change effect between segmental clips. The scene change effect may include, for example, at least one of a cut (a technique in which one scene instantly transitions to another scene), a dissolve (a technique in which one scene transitions to another scene, gradually fading), and a fade (a technique in which one image gradually changes to a full white scene or a white scene gradually changes to a different image), and may include other scene change effects without being limited thereto.

In operation 260, the processor 120 may automatically generate a cross-edited video by joining the subject-synchronized segmental clips.

According to an embodiment, the processor 120 may compose the segmental clips to be connected from one clip to a next clip, thereby generating one cross-edited video (or an after video). The processor 120 may display the generated cross-edited video on the video editing UI screen.

Figure 3:
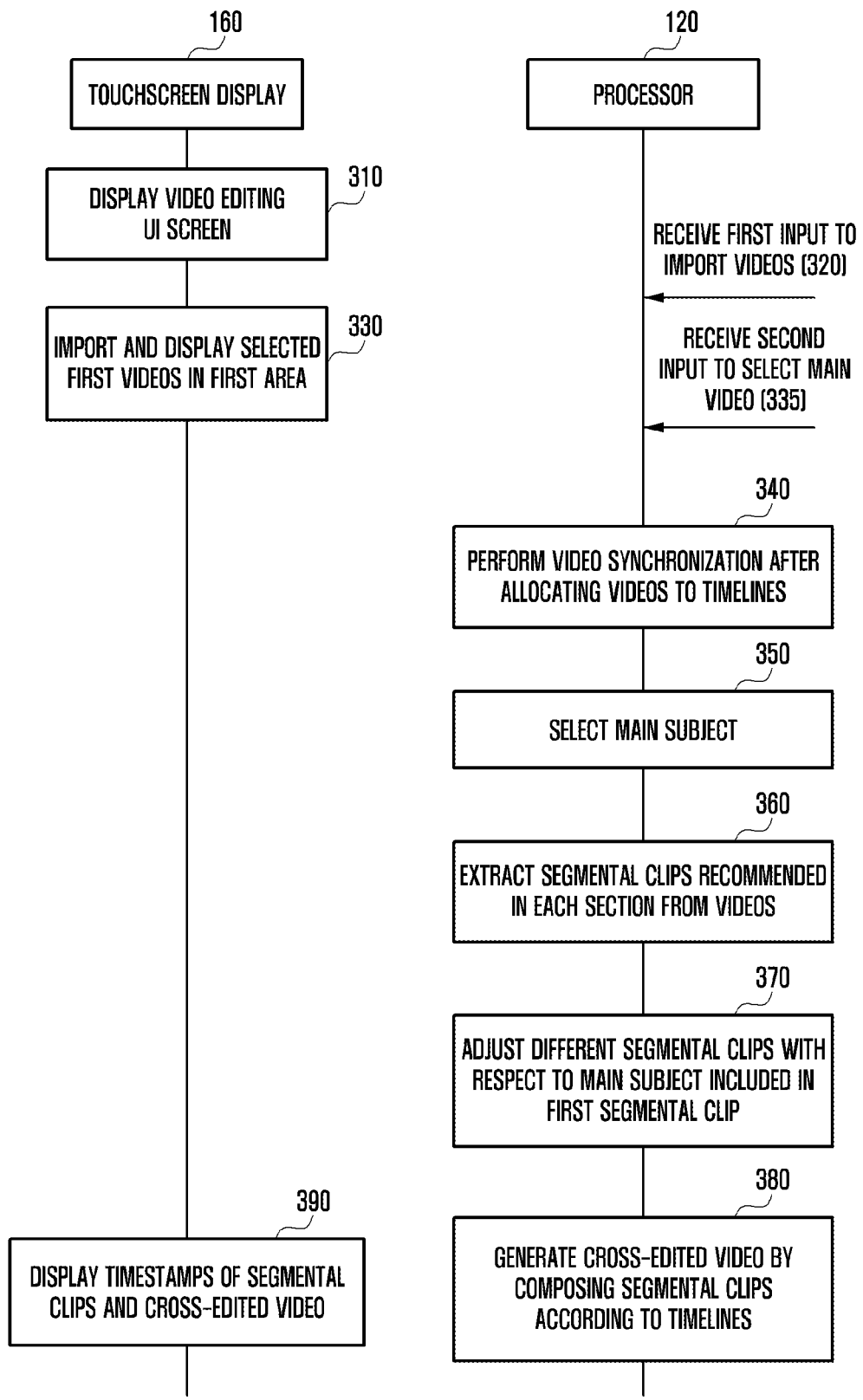
FIG. 3 illustrates a cross-edited video generation method of an electronic device according to various example embodiments.

FIG. 3 illustrates a cross-edited video generation method of an electronic device according to various embodiments, and FIG. 4 illustrates a cross-edited video generation screen of an electronic device.

Referring to FIG. 3 and FIG. 4, according to various embodiments, the electronic device (e.g., the electronic device 101 of FIG. 1) may display a video editing user interface (UI) screen on a touchscreen display 160 (e.g., the display module 160 of FIG. 1) in operation 310.

For example, the touchscreen display 160 may display a video editing UI screen in response to an event (e.g., a user touch input) of requesting execution of a video editing function (or a video editing application). The electronic device 101 may support a function of automatically generating a cross-edited video using previously generated existing videos (e.g., base videos).

In operation 320, a processor 120 may receive a first input to import at least two videos (e.g., base videos) to be edited through the video editing UI screen. Here, the first input may refer to a plurality of user inputs.

For example, the electronic device 101 may support at least one of a function of importing videos stored in the electronic device 101 through a video editing UI screen, a function of importing videos stored in a server by connecting to the server, or a function of importing videos provided by an open source through a web browser.

In operation 330, the touchscreen display 160 may display videos imported by the first input under control of the processor 120.

According to an embodiment, the processor 120 may detect the first input to import the base videos, and may control the display module 160 to display a plurality of base videos imported by the first input in a first area 410 of the video editing UI screen 401. Each "module" herein may comprise circuitry.

The video editing UI screen will be described with reference to FIG. 4, which is only for illustration, and is not limited thereto. For example, the video editing UI screen 401 may include the first area 410 providing videos to be edited, a second area 420 providing a cross-edited video to be generated, a third area 430 providing a timeline (or timestamp) of each video, and a video editing generation item 440.

Although not shown in the drawing, the video editing UI screen 401 may further include menu items (not shown) enabling user option configuration in addition to the video editing generation item.

For example, FIG. 4 shows an example in which the first area 410 is divided into four subdivisions, and a first video 4111, a second video 4112, a third video 4113, and a fourth video 4114 may be sequentially imported into the four subdivisions according to a user input. Referring to the drawing shown in 4001, a user may select a first subdivision to import a video list, and may select one video in the video list to import the first video 4111. Subsequently, the user may import the second video 4112, the third video 4113, and the fourth video 4114 by sequentially selecting a second subdivision, a third subdivision, and a fourth subdivision.

According to an embodiment, when the videos are imported into the first area 410, the processor 120 may display timelines 4310 of audio signals corresponding to the respective imported videos in the third area 430. Here, since a cross-edited video is not yet generated, the second area 420 may be displayed as an empty space. Each "processor" herein comprises processing circuitry.

In operation 335, the processor 120 may receive a second input to select a main video from among the imported videos (e.g., the base videos).

According to an embodiment, the processor 120 may display a pointer (or a marker or an indicator) (not shown) supporting selection of a main video at an arbitrary position in the first area 410, and may designate a base video imported into a subdivision where the pointer is positioned according to a user input among the base videos as the main video.

According to another embodiment, the electronic device 101 may support a function of designating a base image imported into a designated subdivision (e.g., a subdivision into which the first video 4111 is imported) of the first area 410 as the main video.

According to an embodiment, the electronic device 101 may support a function of changing the main video to change an editing theme after designating the main video.

According to an embodiment, the processor 120 may generate a cross-edited video (or an after video), based on the playback length of an audio signal included in the main video, and may designate the audio signal to be used for the cross-edited video. For example, the processor 120 may generate one cross-edited video by joining segmental clips, based on the audio signal included in the main video.

According to an embodiment, the processor 120 may determine an editing theme, based on the selected main video. For example, the processor 120 may analyze the main video to extract a characteristic pattern element (e.g., a person feature, a behavior pattern, an audio feature, and a camera moving feature) in the main video, and may determine an editing theme, based on the extracted pattern element. For example, when the main video is a video in which a specific person is singing on a stage, the processor 120 may determine audio and the specific person as an editing theme.

According to an embodiment, the processor 120 may predict a characteristic pattern element in the video using a deep learning engine, and may determine an editing theme based on the characteristic pattern element.

According to an embodiment, the electronic device 101 may support an option function of selecting an editing theme (e.g., a person similarity-oriented theme, a background similarity-oriented theme, a camera moving-oriented theme, a stage similarity-oriented theme) according to a user input after selecting the main video), and an editing theme may be configured by the user.

According to an embodiment, the electronic device 101 may automatically perform video size adjustment (deletion of an unnecessary section of a video) and video color correction (adjusting color distortion and white balance using a color correction algorithm) separately on each of the plurality of base videos imported into the first area 410, and these processes may be omitted. For example, when there is a section of a conversation between people other than music playback in the videos, the electronic device 101 may automatically delete frames relating to the section of the conversation without the user's consent.

According to another embodiment, the electronic device 101 may include a user option function of performing video size adjustment or video color correction according to a user request separately for each of the plurality of base videos imported into the first area 410.

In operation 340, the processor 120 may perform video synchronization after allocating the videos to the timelines.

According to an embodiment, the processor 120 may designate an audio signal of a first video (e.g., the main video) as a reference among the base videos as a main audio signal, and may synchronize the videos by excluding audio signals of other videos.

According to an embodiment, the processor 120 may synchronize the videos by matching feature points of the other videos (e.g., a second video, a third video, . . . , an Nth video) to coincide according to a feature point (e.g., a high/low change point) of a timeline of the first video (e.g., the main video) as the reference among the base videos. Here, a feature point may be at least one of a sound source start time, a time at which a voice first comes out, a change in a facial feature point of a specific subject (e.g., the shape of a singer's lips), a time in voice change between people, and a time at which a behavioral characteristic (e.g. dancing) of a person first starts, but is not limited thereto.

After synchronizing the videos, the processor 120 may perform an update to a video signal synchronized with the timelines displayed in the third area 430.

According to an embodiment, to synchronize the videos, the processor 120 may synchronize the videos, based on an audio signal of the videos, and may additionally synchronize the video by performing time synchronization using motion vectors of objects included in the videos.

In operation 350, the processor 120 may select a main subject from among the objects included in the videos.

According to an embodiment, the processor 120 may detect a user input to select one of subjects included in the plurality of base videos displayed on the screen, and may designate a subject selected according to the user input as the main subject.

According to an embodiment, the processor 120 may identify the objects from the respective base videos through an object recognition function, and may comparatively analyze characteristics of the objects, thereby selecting (or choosing) the main subject to be the center of the cross-edited video to be generated.

For example, when a plurality of subjects is present in the videos, the processor 120 may select a subject displayed for the most time in the videos, a subject positioned most at the center of the screen in the videos, and a subject focused most at camera angles as main subjects.

According to an embodiment, an order in which operation 340 and operation 350 are performed may be changed.

In operation 360, the processor 120 may extract segmental clips recommended (or selected) for each section from the base videos synchronized according to the timeline.

According to an embodiment, the processor 120 may additionally designate candidate points (or candidate spots), based on feature points of audio signals of synchronized timelines, and may designate an interval between a feature point and a candidate point as one segmental section. The processor 120 may comparatively analyze similarity, based on image frames corresponding to the feature points and the candidate points, and may crop part corresponding to a designated segmental section from one recommended (or selected) video among the base videos, thereby selecting a segmental clip.

The processor 120 may select segmental clips recommended (or selected) for each segmental section and may extract a plurality of segmental clips corresponding to the playback length of the video.

For example, assuming that a video length is 5 minutes, the processor 120 may extract a first segmental clip corresponding to a first section from the first video among the base videos, may extract a second segmental clip corresponding to a second section from the second video, may extract a third segmental clip corresponding to a third section from the third video, may extract a fourth segmental clip corresponding to a fourth section from the fourth video, may extract a fifth segmental clip corresponding to a fifth section from the first video, may extract a sixth segmental clip corresponding to a sixth section from the third video, and may extract an Nth segmental clip corresponding to an Nth section from the Nth video. Hereinafter, a process of selecting and recommending a segmental clip from the base videos will be described with reference to FIG. 5A and FIG. 5B.

In operation 370, the processor 120 may adjust (or correct) the segmental clips so that the subjects of other segmental clips are synchronized with respect to the main subject included in the first segmental clip.

According to an embodiment, the processor 120 may extract a feature point (e.g., a feature point of eye, nose, mouth, and face shapes) of the main subject included in before/after segmental clips, and may perform feature matching between the before/after segmental clips, thereby obtaining a geometric transformation matrix. The processor 120 may obtain a crop size, a crop direction, rotation, and a video ratio, based on the geometric transformation matrix, so that feature points of the main subject are similar, and may perform subject synchronization on the segmental clips, based on the crop size, the crop direction, the rotation, and the video ratio.

According to an embodiment, the processor 120 may automatically impart a scene change effect between segmental clips. The scene change effect may include, for example, at least one of a cut (a technique in which one scene instantly transitions to another scene), a dissolve (a technique in which one scene transitions to another scene, gradually fading), and a fade (a technique in which one image gradually changes to a full white scene or a white scene gradually changes to a different image), and may include other scene change effects without being limited thereto.

In operation 380, the processor 120 may automatically generate a cross-edited video by joining the subject-synchronized segmental clips of the sections.

According to an embodiment, the processor 120 may compose the segmental clips to be connected from one clip to a next clip, thereby generating one cross-edited video (or an after video), and may display the generated cross-edited video on the video editing UI screen.

In operation 390, the touchscreen display 160 may display the cross-edited video generated based on the segmental clips automatically recommended (or selected) by the electronic device 101 and timestamps of the segmental clips under control of the processor 120.

For example, as shown in 4002, the user may select the video editing generation item 440 included in the video editing UI screen. In response to an input to select the edited video generation item 440, the processor 120 may analyze the videos (e.g., the first video 4111, the second video 4112, the third video 4113, and the fourth video 4114) imported into the first area 410 to designate the segmental clips recommended (or selected) for the respective sections, may automatically generate a cross-edited video 4210, based on the segmental clips, and may output the cross-edited video to the second area 420. When the cross-edited video 4210 is generated, the processor 120 may update the timelines to display the timestamps 4320 of the segmental clips of the respective videos in the third area 430.

The user may identify the cross-edited video 4210 automatically generated by playing the cross-edited video 4210 displayed in the second area 420, and may identify the segmental clips in the designated sections of the respective videos for cross-editing through the timestamps 4320 displayed in the third area 430.

According to an embodiment, the electronic device 101 may support a function of playing only a segmental clip of a selected time stamp when the time stamp is selected and a function of modifying an editing effect of each segmental clip.

According to another embodiment, although FIG. 4 shows an example of importing four videos, when the user imports two videos or only three videos, the processor 120 may generate a cross-edited video, based on only the videos imported into the video editing UI screen 401.

According to various embodiments, without a user's additional editing input, the electronic device may analyze videos to automatically recommend a segmental clip in each section, may synchronize recommended (or selected) segmental clips with respect to a subject, and may automatically generate a cross-edited video, thereby saving time required for editing when generating the cross-video.

Figure 5A:
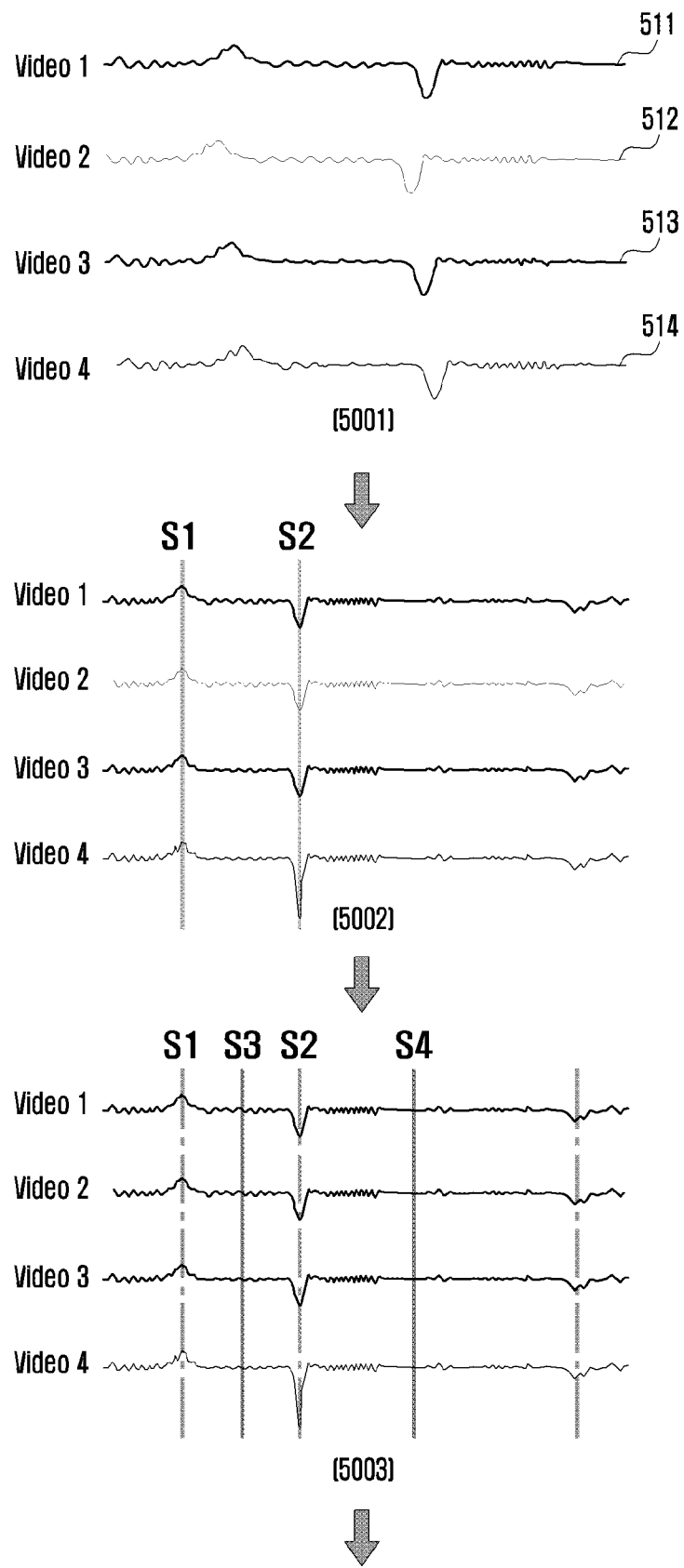

FIGS. 5A and 5B illustrate examples of adjusting video synchronization of videos according to various embodiments.

Referring to FIGS. 5A and 5B, according to various embodiments, to synchronize videos, a processor 120 of an electronic device 101 may arrange audio signals according to a timeline, and may then analyze feature points of the audio signals to recommend segmental clips in sections from the respective base videos.

For example, when there are four base videos (video 1, video 2, video 3, and video 4), a timeline of a first audio signal 511 of video 1, a timeline of a second audio signal 512 of video 2, a timeline of a third audio signal 513 of video 3, and a timeline of a fourth audio signal 514 of video 4 may be arrange as shown in 5001.

The processor 120 may identify the feature points of the audio signals. For example, the processor 120 may identify points having significant variance in the audio signals as the feature points, and may consider the feature points as candidate points of segmental sections.

As shown in 5002, for example, first points S1 and second points S2 are distinct change points in the signals, and the processor 120 may identify these points as feature points. The first points S1 and the second points S2 are merely examples, and additional feature points may exist.

When video 1 is designated as a main video, the processor 120 may synchronize the second audio signal 512, the third audio signal 513, and the fourth audio signal 514 with the first audio signal 511 so that the first points 51 and the second points S2 coincide or substantially coincide.

As shown in 5003, to select segmental sections, the processor 120 may designate third points S3 which are midpoints between the first points S1 and the second points S2 as candidate points, and may designate fourth points S4 which are midpoints between other N points after the second points S2 as candidate points.

The processor 120 may compare frame videos at the first points S1, the second points S2, the third points S3, and the fourth points S4, and may select points at which the frame images have similarity as shown in 5004.

For example, the processor 120 may compare and analyze frame images at the first points S1, the second points S2, the third points S3, and the fourth points S4 and may identify whether the same subject exists.

Referring to similarities shown in 5004, the same first subject 520 exists at the first points S1 of video 1, video 2, and video 3. The first subject 520 exists at the third points S3 of video 1, video 3, and video 4, and exists at the second points S2 of video 1, video 2, video 3, and video 4. The first subject 520 exists at the fourth points S4 of video 1, and a different second subject exists at the fourth points S4 of video 2 and video 4.

Although not shown in the drawing, when no similarity is found at the candidates points between the videos, the processor 120 may exclude the candidate points from a candidate point list.

As shown in 5005, the processor 120 may select recommended (or selected) segmental clips, based on the similarity between the candidate points.

For example, assuming that the processor 120 arbitrarily selects video 1 to recommend a first segmental clip 541 for an interval between start positions and the first points S1, the processor 120 may select video 3 including the first subject 520 to select a second segmental clip 542 for an interval between the first points S1 and the third points S3 by comparing similarities between the first points S1 and the third points S3. Subsequently, the processor 120 may select video 4 to select a third segmental clip 543 by comparing similarities between the third points S3 and the second points S2.

The processor 120 may select a fourth segmental clip 544 from video 2 including the second subject 530 for an interval between the second points S2 and the fourth points S4 to maintain continuity after the fourth points S4, and may then select a fifth segmental clip 545 from video 4 including the second subject 530.

FIG. 6 illustrates examples of timestamps of segmental clips according to various embodiments.

Referring to FIG. 6, according to an embodiment, an electronic device (e.g., the electronic device 101 of FIG. 1) may generate a cross-edited video 620 by joining cross-edited segmental clips, based on an audio signal 610.

The audio signal 610 of a video selected as a main video may be used as an audio signal of the cross-edited video.

For example, referring to a time stamp of the cross-edited video, the cross-edited video may include a first segmental clip 601 and a fifth segmental clip 605 extracted from video 1, a second segmental clip 602 and a seventh segmental clip 607 extracted from video 2, a third segmental clip 603 and a sixth segmental clip 606 extracted from video 3, and a fourth segmental clip 604 and an eighth segmental clip 608 extracted from video 4.

The processor 120 may repeat a process of composing the segmental clips in a manner such that an end position of the first segmental clip 601 is joined to a start position of the second segmental clip 602 and an end position of the second segmental clip 602 is joined to a start position of the third segmental clip 603, thereby automatically generating the cross-edited image 620 corresponding to the overall length of the audio signal 610.

FIG. 7 illustrates a cross-edited video generation method of an electronic device according to various embodiments, and FIG. 8 illustrates cross-edited video generation screens of an electronic device according to various embodiments.

Referring to FIG. 7 and FIG. 8, according to various embodiments, the electronic device (e.g., the electronic device 101 of FIG. 1) may display a video editing user interface (UI) screen 8001 on a touchscreen display 160 (e.g., the display module 160 of FIG. 1) in operation 710.

In operation 720, a processor 120 may receive a first input to import at least two base videos (e.g., stored videos) to be edited through the video editing UI screen. Here, the first input may refer to a plurality of user inputs.

In operation 730, the touchscreen display 160 may display videos imported by the first input on the video editing UI screen under control of the processor 120

For example, the video editing UI screen 8001 shown in FIG. 8 may include a first area 810 providing videos to be edited, a second area 820 providing a cross-edited video to be generated, a third area 830 providing a timeline (or timestamp) 8310 of each video, and a video editing generation item 840. For example, FIG. 8 shows an example in which the first area 810 is divided into four subdivisions, and a first video 8111, a second video 8112, a third video 8113, and a fourth video 8114 may be imported.

In operation 735, the processor 120 may receive a second input to select a main video from among the imported videos (e.g., the base videos).

According to an embodiment, the processor 120 may display a pointer (or a marker or an indicator) (not shown) supporting selection of a main video at an arbitrary position in the first area 810, and may designate a base video imported into a subdivision where the pointer is positioned according to a user input among the base videos as the main video.

According to another embodiment, the electronic device 101 may support a function of designating a base image imported into a designated subdivision (e.g., a subdivision into which the first video 8111 is imported) of the first area 810 as the main video.

According to an embodiment, the processor 120 may determine an editing theme, based on the selected main video. For example, the processor 120 may analyze the main video to extract a characteristic pattern element (e.g., a movement of a subject, a facial expression of a subject, a video taking angle, a video taking time, a video taking location, a camera moving feature (e.g., see metadata)) in the main video, and may determine an editing theme, based on the extracted pattern element.

According to an embodiment, the processor 120 may predict a characteristic pattern element in the video using a deep learning engine, and may determine an editing theme based on the characteristic pattern element.

According to an embodiment, the electronic device 101 may support an option function of selecting an editing theme (e.g., a person similarity-oriented theme, a background similarity-oriented theme, a camera moving-oriented theme, a stage similarity-oriented theme) according to a user input after selecting the main video), and an editing theme may be configured by a user.

According to an embodiment, the electronic device 101 may automatically perform video size adjustment (deletion of an unnecessary section of a video) and video color correction (adjusting color distortion and white balance using a color correction algorithm) separately on each of the plurality of base videos imported into the first area 810, and these processes may be omitted.

According to another embodiment, the electronic device 101 may include a user option function of performing video size adjustment or video color correction according to a user request separately for each of the plurality of base videos imported into the first area 810.

In operation 740, the processor 120 may select a main subject from among objects included in the main video.

According to an embodiment, the processor 120 may identify the objects from the respective base videos through an object recognition function, and may comparatively analyze characteristics of the objects, thereby selecting (or choosing) the main subject to be the center of the cross-edited video to be generated.

For example, when a plurality of subjects is present in the videos, the processor 120 may select a subject displayed for the most time in the videos, a subject positioned most at the center of the screen in the videos, and a subject focused most at camera angles as main subjects.

In operation 745, the processor 120 may extract motion vectors of the imported videos.

For example, when videos having different sound sources or a plurality of videos taken in different environments are imported, it may be difficult to perform a synchronization operation based on an audio signal. When a synchronization operation based on audio synchronization cannot be performed, the processor 120 may extract a motion vector of a moving object included in a video for each video.

In operation 750, the processor 120 may perform time synchronization, based on the motion vectors.

According to an embodiment, the processor 120 may identify vector sections estimated as similar movements among the motion vectors of the respective videos, and may perform time synchronization by matching based on the vector sections estimated as the similar movements.

According to an embodiment, the processor 120 may display the video synchronization result of the base videos by updating the third area 830.

In operation 760, the processor 120 may extract segmental clips recommended (or selected) for each section from the time-synchronized videos.

According to an embodiment, the processor 120 may additionally designate candidate points (or candidate spots), based on feature points of the time-synchronized videos, and may designate an interval between a feature point and a candidate point as one segmental section. The processor 120 may comparatively analyze similarity, based on image frames corresponding to the feature points and the candidate points, and may crop part corresponding to a designated segmental section from one recommended (or selected) video among the videos, thereby extracting a segmental clip.

The processor 120 may identify the size of a subject's face in each of the segmental clips in operation 770, and the processor 120 may adjust (or correct) the segmental clips so that the subjects of other segmental clips are synchronized with respect to the main subject included in the first segmental clip in operation 780.

According to an embodiment, the processor 120 may extract a feature point (e.g., a feature point of eye, nose, mouth, and face shapes) of the main subject included in before/after segmental clips, and may perform feature matching between the before/after segmental clips, thereby obtaining a geometric transformation matrix. The processor 120 may obtain a crop size, a crop direction, rotation, and a video ratio, based on the geometric transformation matrix, so that feature points of the main subject are similar, and may perform subject synchronization on the segmental clips, based on the crop size, the crop direction, the rotation, and the video ratio.

For example, the processor 120 may perform subject synchronization so that the face size ratios of the main subjects overlap each other at similar ratios.

According to an embodiment, the processor 120 may automatically impart a scene change effect between segmental clips. The scene change effect may include, for example, at least one of a cut (a technique in which one scene instantly transitions to another scene), a dissolve (a technique in which one scene transitions to another scene, gradually fading), and a fade (a technique in which one image gradually changes to a full white scene or a white scene gradually changes to a different image), and may include other scene change effects without being limited thereto.

In operation 790, the processor 120 may automatically generate a cross-edited video by joining the subject-synchronized segmental clips of the sections.

According to an embodiment, the processor 120 may compose the segmental clips to be connected from one clip to a next clip, thereby generating one cross-edited video (or an after video), and may display the generated cross-edited video on the video editing UI screen.

In operation 795, the touchscreen display 160 may display the cross-edited video generated based on the segmental clips automatically recommended (or selected) by the electronic device 101 and timestamps of the segmental clips under control of the processor 120.

For example, as shown in 8002, in response to an input to select the edited video generation item 840, the processor 120 may extract recommended (or selected) segmental clips from the videos (e.g., the first video 8111, the second video 8112, the third video 8113, and the fourth video 8114) imported into the first area 810, may automatically generate a cross-edited video 8210, based on the segmental clips, and may output the cross-edited video to the second area 820. When the cross-edited video 8210 is generated, the processor 120 may update the timelines to display the timestamps 8320 of the segmental clips of the respective videos in the third area 830.

Here, even though the face sizes of the subjects included in the segmental clips are different, the aspect ratios, sizes, and angles of the segmental clips may be adjusted with respect to the subjects' faces, thereby generating a cross-edited video in which the segmental clips are smoothly joined.

Figure 9:
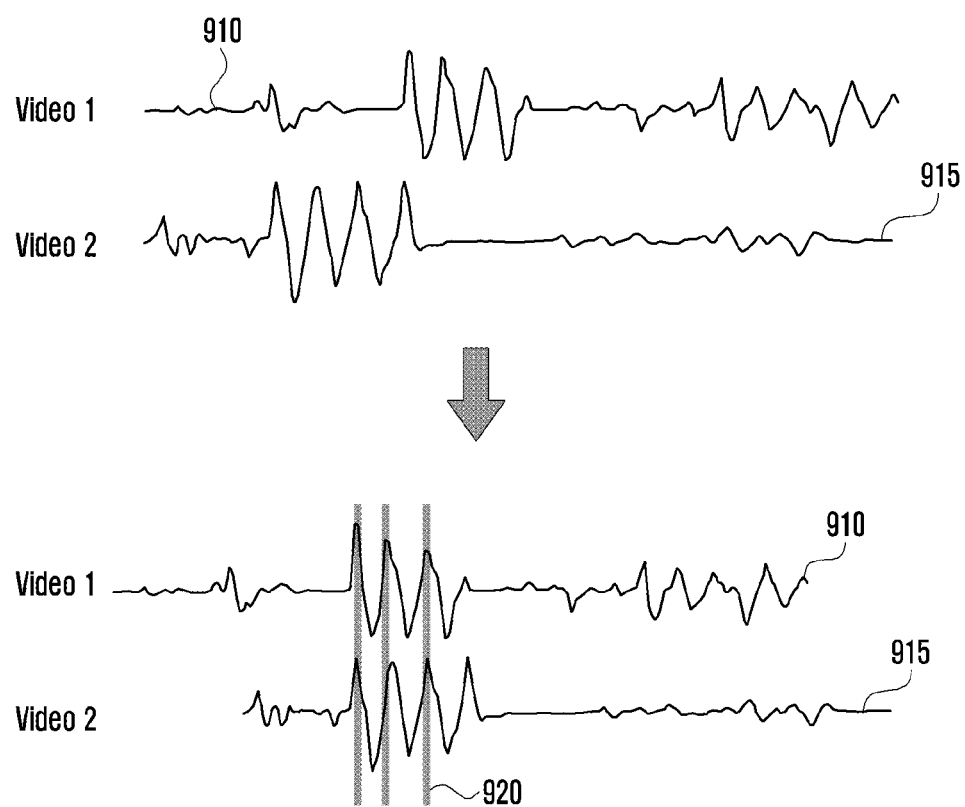
FIG. 9 illustrates examples of adjusting time synchronization of videos according to various example embodiments.

FIG. 9 illustrates examples of adjusting time synchronization of videos according to various embodiments. Each embodiment herein may be used in combination with any other embodiment described herein.

Referring to FIG. 9, according to various embodiments, a processor 120 of an electronic device 101 may extract a motion vector of a moving object included in videos and may perform time synchronization of the videos, based on the motion vector. "Based on" as used herein covers based at least on.

For example, motion vectors according to movements of moving objects (e.g., subjects) are extracted from video 1 and video 2, and may be represented by a first motion vector 910 and a second motion vector 915.

The processor 120 may compare the first motion vector 910 and the second motion vector 915 to analyze whether there are sections represented as similar movements, may identify feature points 920 determined as similar movement sections, and may perform time synchronization of video 1 and video 2 with respect to the feature points 920.

After the time synchronization, the processor 120 may recommend and select segmental clips from the videos, based on the similarity between the videos, and may automatically generate a cross-edited video using the selected segmental clips.

According to various embodiments, a method for automatically generating a cross-edited video by an electronic device 101, the method comprising displaying an edited video user interface screen, receiving a first input to select a plurality of videos generated from at least two difference sources through the edited video user interface screen, performing video synchronization so that timelines of the plurality of selected videos coincide or substantially coincide, extracting segmental clips selected by recommending in each section from the respective videos, based on a main subject selected by analyzing the plurality of videos, adjusting different segmental clips so that subjects included in the different segmental clips are synchronized based on a segmental clip in a first section, automatically generating a cross-edited video by joining segmental clips of respective sections in which the subjects are synchronize, and display the cross-edited video on the edited video user interface screen.

According to various embodiments the video editing user interface screen comprises a first area displaying the plurality of videos, a second area displaying the cross-edited video, a third area displaying the timelines and/or timestamps of the videos, and a cross-edited video generation item, wherein the receiving of the first input further comprises displaying the plurality of videos selected by the first input in the first area.

According to various embodiments, the method further comprising receiving a second input to select a main video from among the plurality of videos, wherein the performing of the video synchronization comprises performing synchronization so that feature points of audio signals corresponding to different videos coincide with a feature point of an audio signal included in the main video.

According to various embodiments, the method further comprising, automatically performing at least one of unnecessary noise section deletion and video color correction for each video before extracting the segmental clips after the performing of the video synchronization.

According to various embodiments, the extracting of the segmental clips further comprises designating a candidate point at and/or proximate a midpoint between a first feature point and a second feature point of the audio signal for each video and designating a first section between the first feature point and the candidate point and a second section between the candidate point and the second feature point, and wherein the recommended segmental clips are extracted by comparing image frames corresponding to the first feature point, the second feature point, and the candidate point designated for each video to analyze similarity between the image frames and cropping part of one recommended video for each section among the videos.

According to various embodiments, the extracting of the segmental clips further comprises selecting the main subject, based on the image frames corresponding to the first feature point, the second feature point, and the candidate point, or designating a subject selected by a user input as the main subject, and wherein at least one of a subject equally exposed at the first feature point, the second feature point, and the candidate point, a subject displayed most in the videos, and a subject positioned at a center of a screen in the videos is selected as the main subject.

According to various embodiments, the extracting of the segmental clips comprises recommending and extracting a second segmental clip from a different video having similarity in the main subject, based on a first segmental clip comprising the main subject.

According to various embodiments, the performing of the video synchronization comprises identifying data about a crop size, a crop direction, rotation, and a video ratio and performing subject synchronization on each segmental clip, based on the identified data, so that feature points of the main subject included in the first segmental clip and the second segmental clip are similar.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device #01) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore$^{TM}$), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the above has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any embodiment(s) described herein may be used in conjunction with any other embodiment(s) described herein.

What is claimed is:

1. An electronic device comprising:
a touchscreen display; and
at least one processor,
memory storing instructions executable by the at least one processor,
wherein the instructions that when executed by the at least one processor, cause the electronic device to:
receive a first input to select a plurality of videos generated from at least two difference sources,
perform video synchronization so that timelines of the plurality of selected videos coincide,
extract segmental clips selected and/or identified in each section from the respective videos of the plurality of videos, based on a main subject being included in the extracted segmental clips, wherein the main subject is selected by a user input from among a plurality of subjects included in the plurality of videos,
adjust the different segmental clips so that the plurality of subjects included in the different segmental clips are synchronized based on a first segmental clip among the segmental clips,
generate a cross-edited video at least by joining the adjusted segmental clips of respective sections in which the subjects are synchronized, and
control to display the cross-edited video on the touchscreen display.

2. The electronic device of claim 1, wherein the instructions, when executed the processor, cause the electronic device to display a video editing user interface screen on the touchscreen display in response to a video editing function execution request, and
wherein the video editing user interface screen comprises a first area displaying the plurality of videos, a second area displaying the cross-edited video, a third area displaying the timelines and/or timestamps of the videos, and a cross-edited video generation item.

3. The electronic device of claim 2, wherein the instructions, when executed the processor, cause the electronic device to:
control the touchscreen display to display the plurality of videos selected by the first input in the first area of the video editing user interface screen,
receive a second input to select a main video from among the plurality of videos, and
identify a characteristic pattern in the main video at least by analyzing the selected main video to determine an editing theme, based on the characteristic pattern.

4. The electronic device of claim 3, wherein the characteristic pattern comprises at least one of a subject face feature, a subject behavior feature, an audio feature, and a camera moving feature.

5. The electronic device of claim 1, wherein the instructions, when executed the processor, cause the electronic device to perform at least one of unnecessary noise section deletion and video color correction for each video, before extracting the segmental clips.

6. The electronic device of claim 1, wherein the instructions, when executed the processor, cause the electronic device to perform the video synchronization, based on feature points included in an audio signal of each video.

7. The electronic device of claim 6, wherein the instructions, when executed the processor, cause the electronic device to designate a candidate point proximate a midpoint between a first feature point and a second feature point of the audio signal for each video, a first section between the first feature point and the candidate point, and a second section between the candidate point and the second feature point, and
extract the selected and/or identified segmental clips based on comparing image frames corresponding to the first feature point, the second feature point, and the candidate point designated for each video to analyze similarity between the image frames and cropping part of a recommended video for each section among the videos.

8. The electronic device of claim 7, wherein the instructions, when executed the processor, cause the electronic device to select the main subject, based on the image frames corresponding to the first feature point, the second feature point, and the candidate point, and
wherein at least one of a subject equally exposed at the first feature point, the second feature point, and the candidate point, a subject displayed most in the videos, and a subject positioned at a center of a screen in the videos is to be selected as the main subject.

9. The electronic device of claim 8, wherein the instructions, when executed the processor, cause the electronic device to recommend and extract a second segmental clip from a different video having similarity in the main subject, based on a first segmental clip comprising the main subject.

10. The electronic device of claim 9, wherein the instructions, when executed the processor, cause the electronic device to identify data about a crop size, a crop direction, rotation, and a video ratio, and to perform subject synchronization on each segmental clip, based on the identified data, so that feature points of the main subject included in the first segmental clip and the second segmental clip are similar.

11. The electronic device of claim 9, wherein the instructions, when executed the processor, cause the electronic device to automatically impart a scene change effect between the segmental clips, and
wherein the scene change effect comprises at least one of a cut effect, a dissolve effect, and a fade effect.

12. The electronic device of claim 6, wherein the instructions, when executed the processor, cause the electronic device to extract a motion vector based on a movement of an object included in each video, and perform time synchronization according to a video signal based on the motion vector, when the video synchronization is unable to be performed based on the audio signal.

13. A method for automatically generating a cross-edited video by an electronic device, the method comprising:
- displaying an edited video user interface screen;
- receiving a first input to select a plurality of videos generated from at least two difference sources through the edited video user interface screen;
- performing video synchronization so that timelines of the plurality of selected videos substantially coincide;
- extracting segmental clips selected and/or identified in each section from the respective videos of the plurality of videos, based on a main subject being included in the extracted segmental clips, wherein the main subject is selected by a user input from among a plurality of subjects included in the plurality of videos;
- adjusting the different segmental clips so that the plurality of subjects included in the different segmental clips are synchronized based on a first segmental clip among the segmental clips;
- generating a cross-edited video by joining the adjusted segmental clips of respective sections in which the subjects are synchronized; and
  - display the cross-edited video on the edited video user interface screen.

14. The method of claim 13, wherein the video editing user interface screen comprises a first area displaying the plurality of videos, a second area displaying the cross-edited video, a third area displaying the timelines and/or timestamps of the videos, and a cross-edited video generation item, and
- wherein the receiving of the first input further comprises displaying the plurality of videos selected by the first input in the first area.

15. The method of claim 13, further comprising:
- receiving a second input to select a main video from among the plurality of videos,
- wherein the performing of the video synchronization comprises performing synchronization so that feature points of audio signals corresponding to different videos coincide with a feature point of an audio signal included in the main video.

16. The method of claim 13, further comprising:
- automatically performing at least one of unnecessary noise section deletion and video color correction for each video before extracting the segmental clips after the performing of the video synchronization.

17. The method of claim 15, wherein the extracting of the segmental clips further comprises:
- designating a candidate point proximate and/or at a midpoint between a first feature point and a second feature point of the audio signal for each video; and
- designating a first section between at least the first feature point and the candidate point and a second section between at least the candidate point and the second feature point, and
- wherein the selected and/or identified segmental clips are extracted at least by comparing image frames corresponding to the first feature point, the second feature point, and the candidate point designated for each video to analyze similarity between the image frames and cropping part of recommended video for each section among the videos.

18. The method of claim 17, wherein the extracting of the segmental clips further comprises:
- selecting the main subject, based on the image frames corresponding to the first feature point, the second feature point, and the candidate point, and
- wherein at least one of a subject equally exposed at the first feature point, the second feature point, and the candidate point, a subject displayed most in the videos, and a subject positioned at a center of a screen in the videos is selected as the main subject.

19. The method of claim 17, wherein the extracting of the segmental clips comprises recommending and extracting a second segmental clip from a different video having similarity in the main subject, based on a first segmental clip comprising the main subject.

20. The method of claim 19, wherein the performing of the video synchronization comprises identifying data about a crop size, a crop direction, rotation, and a video ratio and performing subject synchronization on each segmental clip, based on the identified data, so that feature points of the main subject included in the first segmental clip and the second segmental clip are similar.

* * * * *